(12) United States Patent
Ma et al.

(10) Patent No.: US 12,115,517 B1
(45) Date of Patent: Oct. 15, 2024

(54) PREPARATION OF POROUS G—$C_3N_4$ TUBES IN-SITU ANCHORED BY WASTE BIOMASS-DERIVED CARBON DOTS AND ITS APPLICATION IN AFLATOXIN REMOVAL

(71) Applicant: QINGDAO AGRICULTURAL UNIVERSITY, Qingdao (CN)

(72) Inventors: Yongchao Ma, Qingdao (CN); Qingli Yang, Qingdao (CN); Ping Liu, Qingdao (CN); Fuguo Xing, Qingdao (CN)

(73) Assignee: QINGDAO AGRICULTURAL UNIVERSITY, Qingdao (CN)

( * ) Notice: Subject to any disclaimer, the term of this patent is extended or adjusted under 35 U.S.C. 154(b) by 0 days.

(21) Appl. No.: 18/660,098

(22) Filed: May 9, 2024

(30) Foreign Application Priority Data

Nov. 6, 2023 (CN) .......................... 202311460428.X

(51) Int. Cl.
| | |
|---|---|
| *B01J 35/39* | (2024.01) |
| *A23D 9/04* | (2006.01) |
| *A23L 11/30* | (2016.01) |
| *B01J 21/18* | (2006.01) |
| *B01J 27/24* | (2006.01) |
| *B01J 31/06* | (2006.01) |
| *B01J 35/45* | (2024.01) |
| *B01J 37/02* | (2006.01) |
| *B01J 37/03* | (2006.01) |
| *B01J 37/06* | (2006.01) |
| *B01J 37/08* | (2006.01) |
| *B01J 37/34* | (2006.01) |

(52) U.S. Cl.
CPC ................ *B01J 21/18* (2013.01); *A23D 9/04* (2013.01); *A23L 11/34* (2016.08); *A23L 11/36* (2016.08); *B01J 27/24* (2013.01); *B01J 31/06* (2013.01); *B01J 35/39* (2024.01); *B01J 35/45* (2024.01); *B01J 37/0236* (2013.01); *B01J 37/036* (2013.01); *B01J 37/06* (2013.01); *B01J 37/084* (2013.01); *B01J 37/343* (2013.01)

(58) Field of Classification Search
CPC .......... B01J 37/084; B01J 21/18; B01J 35/39; B01J 35/45; B01J 37/06; B01J 37/0236; B01J 37/036
USPC .......................................................... 264/28
See application file for complete search history.

(56) References Cited

FOREIGN PATENT DOCUMENTS

| | | |
|---|---|---|
| CN | 107626336 A | 1/2018 |
| CN | 108686697 A | 10/2018 |
| CN | 115445650 A | 12/2022 |
| WO | 2022252175 A1 | 12/2022 |

OTHER PUBLICATIONS

English Translation of CN 108686697 (Year: 2018).*
Shun Fang et al., "Effect of carbon-dots modification on the structure and photocatalytic activity of g-C3N4" Applied Catalysis B: Environmental 185 (2016) 225-232 (Dec. 14, 2015).
Lushan Liu et al., "Preparation of Applications of Carbon Quantum Dots Prepared via Hydrothermal Carbonization Method" Progress in Chemistry, 2018, 30(4): 349-364 (Apr. 10, 2018).

* cited by examiner

*Primary Examiner* — Hannah J Pak
(74) *Attorney, Agent, or Firm* — SZDC Law PC

(57) ABSTRACT

Disclosed are a SA@CDs/g-$C_3N_4$ composite material, a method for preparing same, and an application of the same to aflatoxin removal, which belong to the technical field of organic materials. The method for preparing a SA@CDs/g-$C_3N_4$ composite material includes: adding a CDs/g-$C_3N_4$ compound into water, and uniformly dispersing same through ultrasonic treatment; adding sodium alginate, intensely stirring and fully mixing a mixture, and forming a pregel solution; transferring the fully mixed pregel solution into a mold, and freeze-drying the pregel solution to obtain sponge; and soaking the sponge in a $CaCl_2$) solution for gel, performing washing with deionized water, performing freeze-drying, and obtaining the SA@CDs/g-$C_3N_4$ composite material. The SA@CDs/g-$C_3N_4$ composite material prepared according to the present disclosure can effectively remove residual aflatoxin in foods, and is wild in effect, environmentally-friendly and safe.

2 Claims, 4 Drawing Sheets

PREPARATION OF POROUS G—C₃N₄ TUBES IN-SITU ANCHORED BY WASTE BIOMASS-DERIVED CARBON DOTS AND ITS APPLICATION IN AFLATOXIN REMOVAL

TECHNICAL FIELD

The present disclosure belongs to the technical field of organic materials, and particularly relates to a SA@CDs/g-$C_3N_4$ composite material, a method for preparing same, and an application of the same to aflatoxin removal.

BACKGROUND

A food safety problem ofter occur since grain, edible oil, meat and other foods are susceptible to environmental pollution during planting, storage and livestock and poultry breeding. In addition, some pathogenic microorganisms can grow in these foods and form mycotoxin, for example, aflatoxin (AFT) that can cause huge economic losses and health risks. It is a great challenge to remove aflatoxin for the food industry. At present, aflatoxin is removed by physical and chemical methods. The chemical method generally uses strong oxidants (ozone, hydrogen peroxide, etc.). In despite of effective aflatoxin removal, these strong oxidants can destroy structures of nutrient and flavor substances of agricultural products, affect the flavor and nutrition of products, and is also limited in scale. The physical method can destroy some unstable flavor and nutrient substances with low boiling points since it generally adopt high temperature treatment. Thus, these methods cannot satisfy requirements for the development of modern agricultural product industry due to their effect instability, great losses of nutrients and introduction of new harmful ingredients. In view of this, it is of great significance to explore a more environmentally friendly, more effective and safer method for removing aflatoxin from the foods.

SUMMARY

The present disclosure provides a method for preparing a SA@CDs/g-$C_3N_4$ composite material. The method includes:
adding a CDs/g-$C_3N_4$ compound into water, and uniformly dispersing same through ultrasonic treatment; adding sodium alginate, intensely stirring and fully mixing a mixture, and forming a pregel solution; transferring the fully mixed pregel solution into a mold, and freeze-drying the pregel solution to obtain sponge; and soaking the sponge in a $CaCl_2$) solution for gel, performing washing with deionized water, performing freeze-drying, and obtaining the SA@CDs/g-$C_3N_4$ composite material.

In the method for preparing a SA@CDs/g-$C_3N_4$ composite material, a mass-volume ratio of the CDs/g-$C_3N_4$ compound to the water is within 1:300-1:800, preferably, 1:500, g/mL.

In the method for preparing a SA@CDs/g-$C_3N_4$ composite material, a mass ratio of the CDs/g-$C_3N_4$ compound to the sodium alginate is within 1:4-1:10, preferably, 1:7.5.

In the method for preparing a SA@CDs/g-$C_3N_4$ composite material, a concentration of the $CaCl_2$ solution is within 1 wt %-8 wt %, preferably, 3 wt %.

The present disclosure provides a method for preparing the CDs/g-$C_3N_4$ compound. The method includes:
adding melamine and thiocyanuric acid into water, and stirring evenly a mixture; adding a CDs solution and stir evenly a mixture; and filtering, washing, drying and transferring a mixed solution to a muffle furnace for high-temperature calcination, and obtaining the CDs/g-$C_3N_4$ compound.

In the method for preparing the CDs/g-$C_3N_4$ compound, a molar ratio of melamine to the thiocyanuric acid is within 1:0.5-1:1.5, preferably, 1:1.

In the method for preparing the CDs/g-$C_3N_4$ compound, a molar volume ratio of melamine to the water is within 1:4000-1:8000, preferably, 1:6000, mol/mL.

In the method for preparing the CDs/g-$C_3N_4$ compound, a volume ratio of the CDs solution to the water is within 1-7:60, preferably, 3:60.

In the method for preparing the CDs/g-$C_3N_4$ compound, the high-temperature calcination is performed under the following conditions: heating is performed to 550° C.-650° C. at a rate of 2° C./min-6° C./min, and calcination is performed at this temperature for 3 h-6 h, preferably, heating is performed to 600° C. at a rate of 3° C./min, and calcination is performed at this temperature for 4 h.

The present disclosure provides a method for preparing the CDs solution. The method includes:
placing an orange juice in a reactor lined with polytetrafluoroethylene, and performing high-temperature heating; and performing natural cooling, centrifuging and filtering a reaction product, and forming a transparent brownish-yellow carbon quantum dot solution, that is, the CDs solution.

In the method for preparing the CDs solution, the high-temperature heating is performed under the following condition: heating is performed at 180° C.-210° C. for 8 h-12 h, preferably, at 200° C. for 10 h.

The present disclosure provides a SA@CDs/g-$C_3N_4$ composite material provides by the method described above.

The present disclosure provides an application to aflatoxin removal of the SA@CDs/g-$C_3N_4$ composite material described above. Aflatoxin $B_1$ is selected as aflatoxin.

Tthe present disclosure has the following beneficial effects:

The SA@CDs/g-$C_3N_4$ composite material prepared according to the present disclosure can effectively remove residual aflatoxin in foods, and is wild in effect, environmentally-friendly, safe and recyclable, thus preventing material residuals from affecting food quality.

BRIEF DESCRIPTION OF DRAWINGS

FIG. 2 shows a scanning electron microscope (SEM) image, a transmission electron microscope (TEM) image, a high resolution transmission electron microscope (HRTEM) image and a TEM-EDX element mapping graph of STCN and CSTCN-3, in which FIG. 2a is the SEM image of STCN, FIGS. 2b and 2c are the TEM images of STCN at different magnifications, FIG. 2d is the SEM image of CSTCN-3, FIGS. 2e-2g are the TEM images of CSTCN-3 at different magnifications, FIG. 2h is the HRTEM image (an illustration is a selected area electron diffraction (SAED) image), and FIGS. 2i-1 are TEM-EDX element graphs corresponding to CSTCN-3;

DETAILED DESCRIPTION OF THE EMBODIMENTS

Other materials used in the present disclosure are commercially available unless specially stated. Other terms used in the present disclosure generally have meanings commonly understood by a person of ordinary skill in the art, unless otherwise stated. The present disclosure will be further described in detail below with reference to specific examples. The following examples are merely for illustrating the present disclosure rather than limiting the scope of the present disclosure in any way.

Example 1

A SA@CDs/g-$C_3N_4$ composite material is prepared as follows:

(1) Preparation of a Carbon Quantum Dot Solution

An orange juice of 30 mL of fresh oranges was placed in a reactor of 100 mL lined with polytetrafluoroethylene, and heating was heated at 200° C. for 10 h. Natural cooling was performed, a reaction product was centrifuged and filtered with a polyether sulfone filter of 0.22 μm, and a transparent brownish-yellow carbon quantum dot solution (CDs) was formed.

Figure 1:
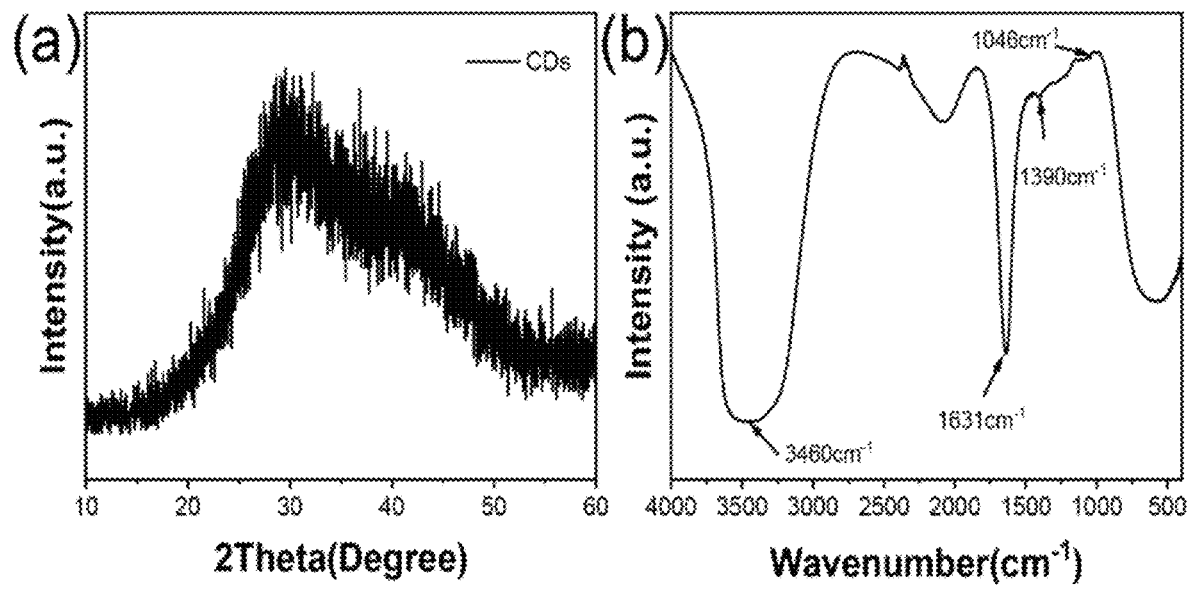
FIG. 1 shows an XRD spectrum and a Fourier transform infrared spectrometer (FTIR) spectrum of a carbon quantum dot solution, in which FIG. a is the XRD spectrum and FIG. b is the FTIR spectrum.

An XRD spectrum and a Fourier transform infrared spectrometer (FTIR) spectrum of the carbon quantum dot solution are shown in FIG. 1. As can be seen from FIG. 1, prepared carbon quantum dots has an amorphous structure, and their surfaces contain functional groups such as a carbonyl group and a hydroxyl group.

(2) Preparation of a CDs/g-$C_3N_4$ Compound

Melamine (0.01 mol) of 1.26 g and thiocyanuric acid (0.01 mol) of 3.16 g were added to deionized water of 60 mL, stirring was performed for 1 h to obtain a uniform mixed solution, CDs solutions of a certain volume (set as 1 mL, 3 mL, 5 mL and 7 mL respectively) were added to the mixed solution, and stirring was continuously performed for 12 h. The mixed solution was filtered, washed, dried and transferred to a muffle furnace, heated to 600° C. at a rate of 3° C./min, and calcined at this temperature for 4 h. The CDs/g-$C_3N_4$ compound was obtained, and was referred to as a CSTCN-xPhotocatalyst for short, where x=1, 3, 5 and 7, that is, under the preparation conditions of 1 mL, 3 mL, 5 mL and 7 ml of the CDs solution respectively.

As a comparison, the present disclosure sets a case that a product is obtained under the same conditions without adding the CDs solution, which is referred to as STCN for short.

Figure 2:
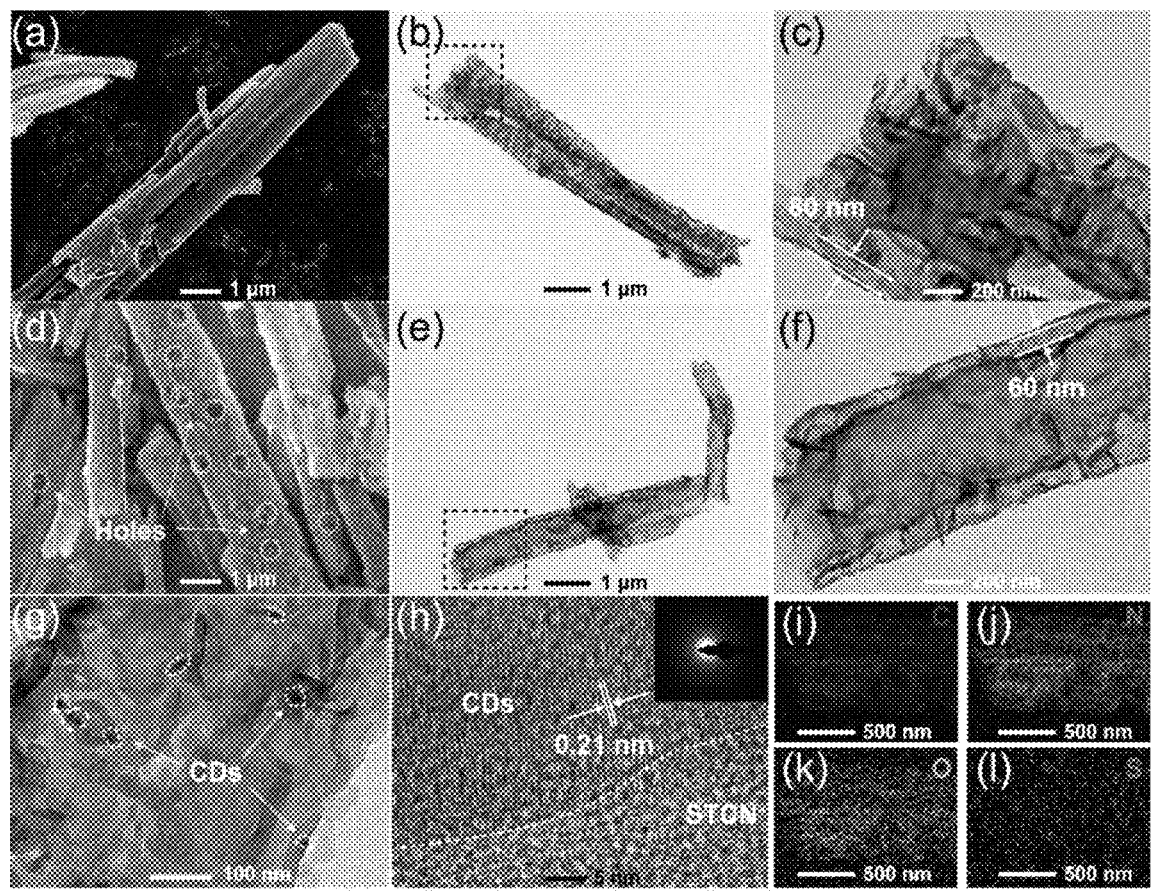

Physical features of CSTCN-3 and STCN were identified, as shown in FIG. 2. FIG. a is a scanning electron microscope (SEM) image of STCN, FIGS. b and c are transmission electron microscope (TEM) images of STCN at different magnifications, FIG. d is SEM image of CSTCN-3, FIGS. e-g are TEM images of CSTCN-3 at different magnifications, FIG. h is a high resolution transmission electron microscope (HRTEM) image (an illustration is a selected area electron diffraction (SAED) image), and FIGS. 1-l are TEM-EDX element graphs corresponding to CSTCN-3.

The micromorphology of STCN and CSTCN-3 may be observed through the SEM image. It can be seen from FIG. 2a that STCN has a nanorod structure. It can be seen from FIG. 2d that after CDs are doped, CSTCN-3 keeps the nanorod structure, but a large number of holes are generated on a surface. It can be clearly seen from the TEM images in FIGS. 2b and e that both STCN and CSTCN-3 have hollowed structures. It can be seen from FIGS. 2c and f that CSTCN-3 has a thin wall, which may be due to a large amount of gas released during calcination. According to an enlarged TEM image of CSTCN-3 shown in FIG. 2g, CD is successfully doped into STCN. It can be seen from FIG. 2h that lattice fringes belonging to a carbon (001) crystal surface appear in the HRTEM, further indicating close combination of the CDs with the STCN. In addition, according to the TEM-EDX element graph of the CSTCN-3 shown in FIGS. 2i-1, C, N, O and S are uniformly distributed in a sample. Based on the above results, it confirms that the CDs derived from citrus are successfully anchored onto g-$C_3N_4$ nanotubes.

Figure 3:
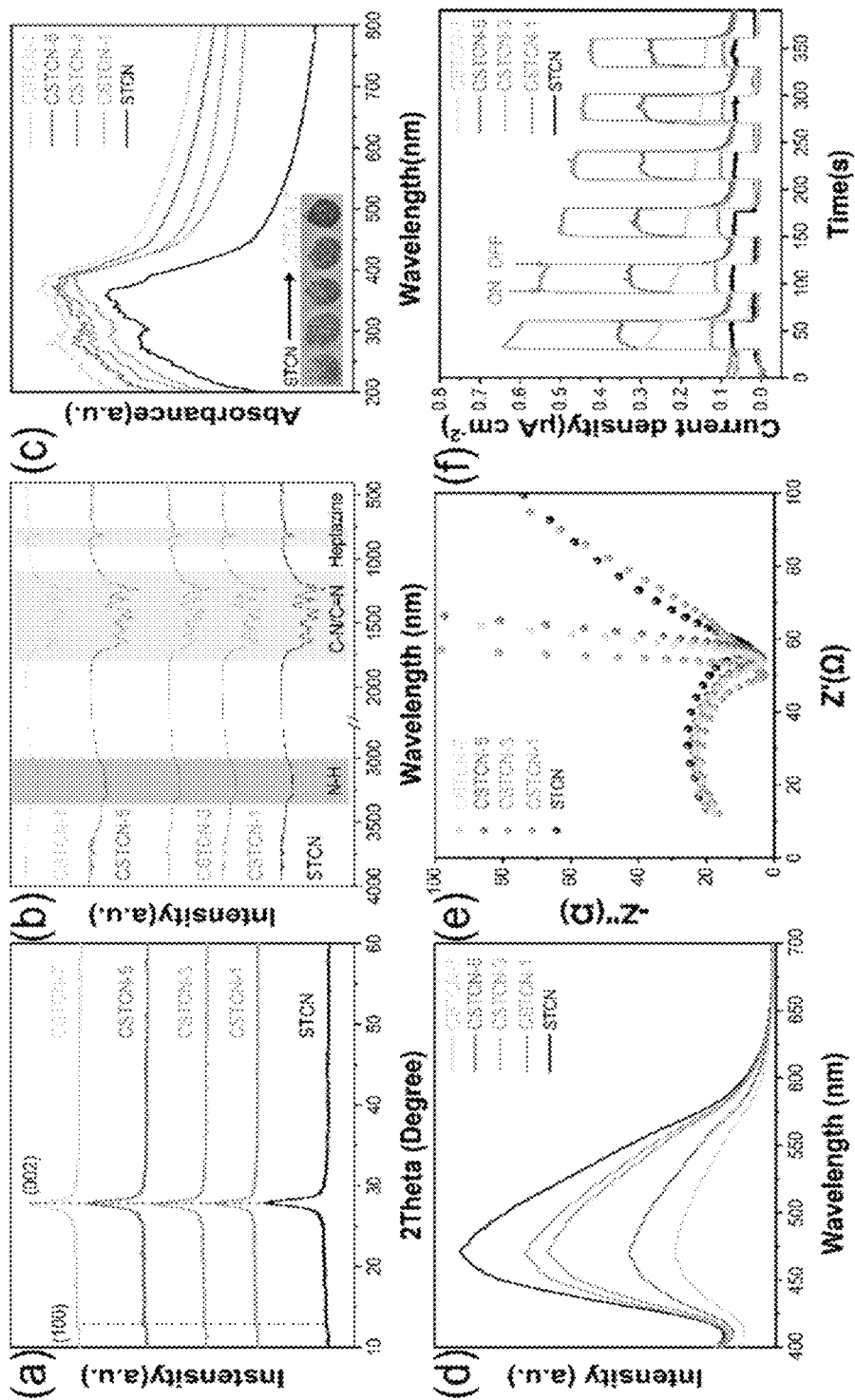
FIG. 3 shows an XRD spectrum (FIG. 3a), an FT-IR spectrum (FIG. 3b), an ultraviolet visible (UV-vis) absorption spectrum (FIG. 3c), a photoluminescence spectroscopy (PL) (FIG. 3d), an electrochemical impedance spectroscopy (EIS) diagram (FIG. 3e) and a transient photocurrent response (FIG. 3f) of a product obtained in step (2) in Example 1, in which curves in FIG. c are CSTCN-7, CSTCN-5, CSTCN-3, CSTCN-1 and STCN in sequence from top to bottom, curves in FIG. d are STCN, CSTCN-3, CSTCN-1, CSTCN-5 and CSTCN-7 in sequence from top to bottom, curves in FIG. 3e are CSTCN-3, CSTCN-7, CSTCN-5, STCN and CSTCN-1 in sequence from left to right, and curves in FIG. 3f are CSTCN-3, CSTCN-5, CSTCN-7, CSTCN-1 and STCN in sequence from top to bottom.

FIG. 3 shows an XRD spectrum (FIG. a), an FT-IR spectrum (FIG. b), an ultraviolet visible (UV-vis) absorption spectrum (FIG. c), a photoluminescence spectroscopy (PL) (FIG. d), an electrochemical impedance spectroscopy (EIS) diagram (FIG. e) and a transient photocurrent response (FIG. f) of a product obtained in step (2).

A crystal structure of the prepared g-$C_3N_4$ material can be known by XRD spectrum. As shown in FIG. 3a, all samples show two similar characteristic diffraction peaks, a broad peak at 13.1° corresponds to in-plane repeated stacking of tris-triazine rings, and a sharp peak at 27.3° belongs to surface stacking of conjugated aromatic units. Similar to the XRD image, FT-IR spectra of all samples show almost the same characteristic peaks. As shown in FIG. 3b, a sharp peak at 816 $cm^{-1}$ is attributed to the formation of heptazine rings, and many peaks at 1100 $cm^{-1}$-1750 $cm^{-1}$ are attributed to the tensile vibration of C—N heterocycles. A broad peak in the range of 3000 $cm^{-1}$-3500 $cm^{-1}$ is attributed to adsorbed water and N—H tensile vibration. Compared with the STCN, a curve of CSTCN-x modified by the CDs has no significant change, indicating that a crystal and a molecular structure of STCN in the composite material are not affected by the CDs.

Enhancing light absorption is one of the most effective methods to improve the catalytic performance of a photocatalyst. As shown in FIG. 3c, due to a quantum effect of the CDs, a light absorption capacity of the CSTCN-x composite material is significantly enhanced. In addition, the light absorption capacity is further enhanced with an increase in a concentration of quantum dots. A color of the sample gradually changes from yellow to brown. The separation and transfer efficiency of photo-generated carriers are measured by using photoluminescence and time-resolved photoluminescence. As shown in FIG. 3d, after the CDs are introduced, the CSTCN-x composite material shows a lower PL strength than STCN. The results show that the introduction of CD can effectively promote the separation of carriers.

Electrochemical characterization is used to further evaluate separation and transfer efficiency of effective photogenerated carriers in the CSTCN-X. FIG. 3e shows the electrochemical impedance spectroscopy (EIS) of a prepared catalyst. Compared with the STCN, the CSTCN-3 shows a shorter arc radius, indicating a smaller charge transfer resistance and a more effective charge separation efficiency. In addition, as shown in FIG. 3f, the CSTCN-3 shows a highest photocurrent response intensity in a repetition period of "on-off" illumination, indicating that a carrier transmission rate is faster in visible light. Thus, the CSTCN-3 has the best photocatalytic performance. However, with an increase in a doping concentration of the CDs, the photocurrent response intensity decreases, which may be attributed to the introduction of a new complex locus with the increase of CDs.

Figure 4:
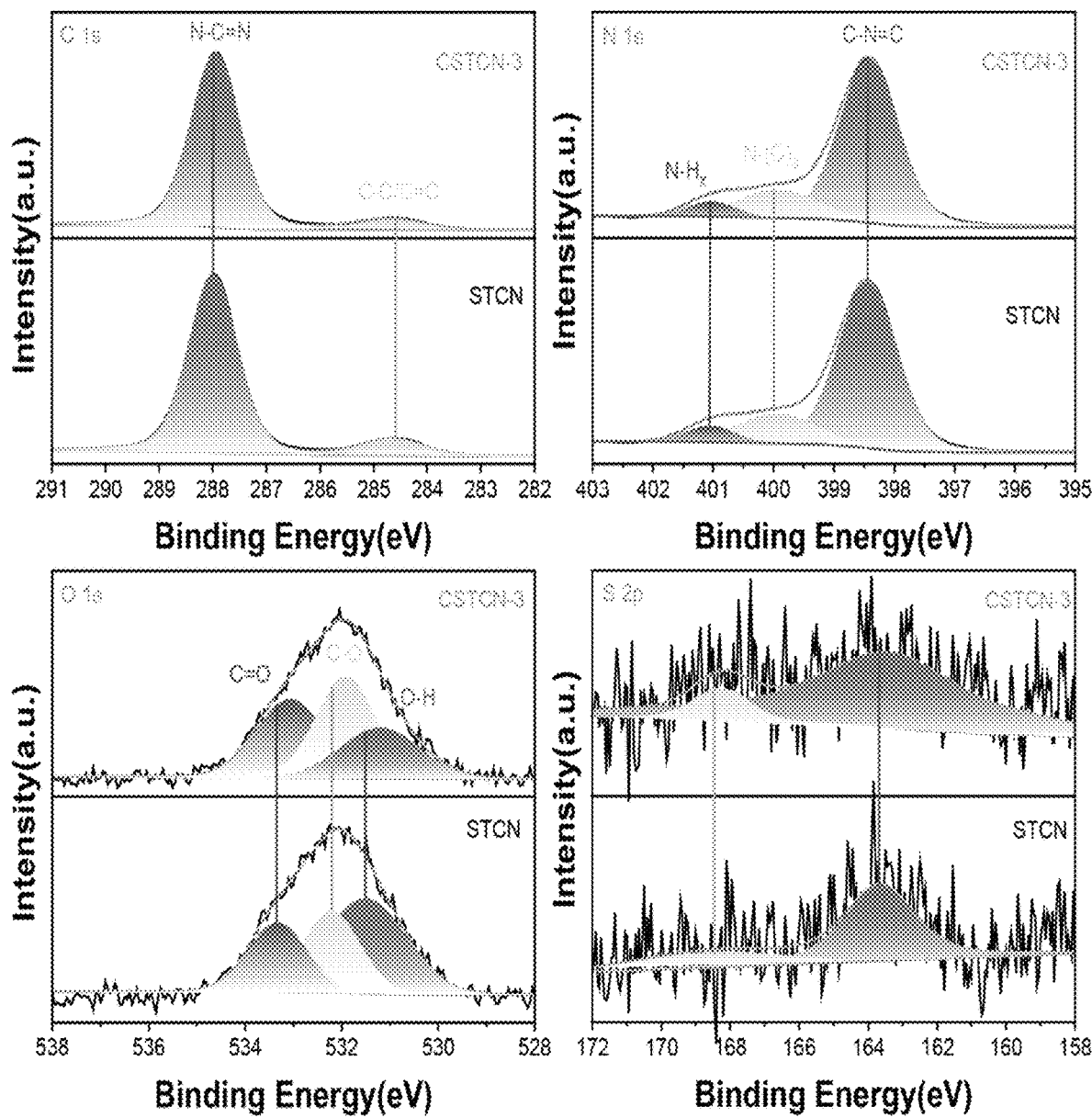
FIG. 4 shows high-resolution XPS spectra of STCN and CSTCN-3.

FIG. 4 shows high-resolution XPS spectra of STCN and CSTCN-3. Surface composition and elemental composition of the prepared sample is analyzed through the XPS spectrum. The high-resolution C1s spectrum in FIG. 4a can be deconvoluted into two peaks with binding energies of 284.7 eV and 287.9 eV, respectively, which are attributed to C—C/C=C and N—C=N respectively. As shown in FIG. 4b, the N1s spectrum can be fitted to three peaks at 398.4 eV, 399.9 eV and 401.1 eV. These peaks correspond to C—N=C, N—(C)$_3$ and N—Hx respectively. FIG. 4c shows three peaks obtained in the high-resolution O1s spectrum, which belong to C—O of 531.5 eV, C—O of 532.2 eV and O—H/adsorbed water of 533.3 eV respectively. Notably, compared with the STCN, contents of C=O and C—O on the surface of CSTCN-3 increase significantly, which may be attributed to existence of a large number of oxygen-containing functional groups on the surface of the CD. A weak S element signal is found in the high resolution S2p spectrum. A peak at 163.4 eV is considered to be an S—N bond, while a peak at 162.8 eV is determined to indicate generation of sulfur oxides. In addition, all the peaks of O1s in CSTCN-3 shift to a lower binding energy, indicating that an electron flow exists in the CDs in the composite material.

Since the CSTCN-3 has an optimal photocatalytic performance, the present disclosure directly uses the CSTCN-3 to prepare the SA@CSTCN compound, as shown in the following step (3).

(3) Preparation of a SA@CDs/g-C$_3$N$_4$ Composite Material

Addition of a CSTCN-3 photocatalyst of 0.1 g into 50 mL deionized water was performed, and ultrasonic treatment was performed for 30 min to uniformly disperse the photocatalyst. Sodium alginate (SA) of 0.75 g was added, a mixture was intensely stirred for 6 h and fully mixed, and a pregel solution was formed. The fully mixed pregel solution was transferred into a mold, and the pregel solution was freeze-dried for 24 h to obtain sponge. The sponge was soaked in 3 wt % CaCl$_2$) solution of 300 mL for 6 h for gel. Thorough washing was performed with deionized water, freeze-drying was performed for 36 h, and a sodium alginate gel tablet (that is, the SA@CDs/g-C$_3$N$_4$ composite material) with attached CSTCN-3 was obtained, and also be referred to SA@CSTCN sponge due to its spongy physical shape.

As a comparison, the present disclosure sets a case that SA sponge is obtained under the same conditions without adding the CSTCN photocatalyst.

Figure 5:
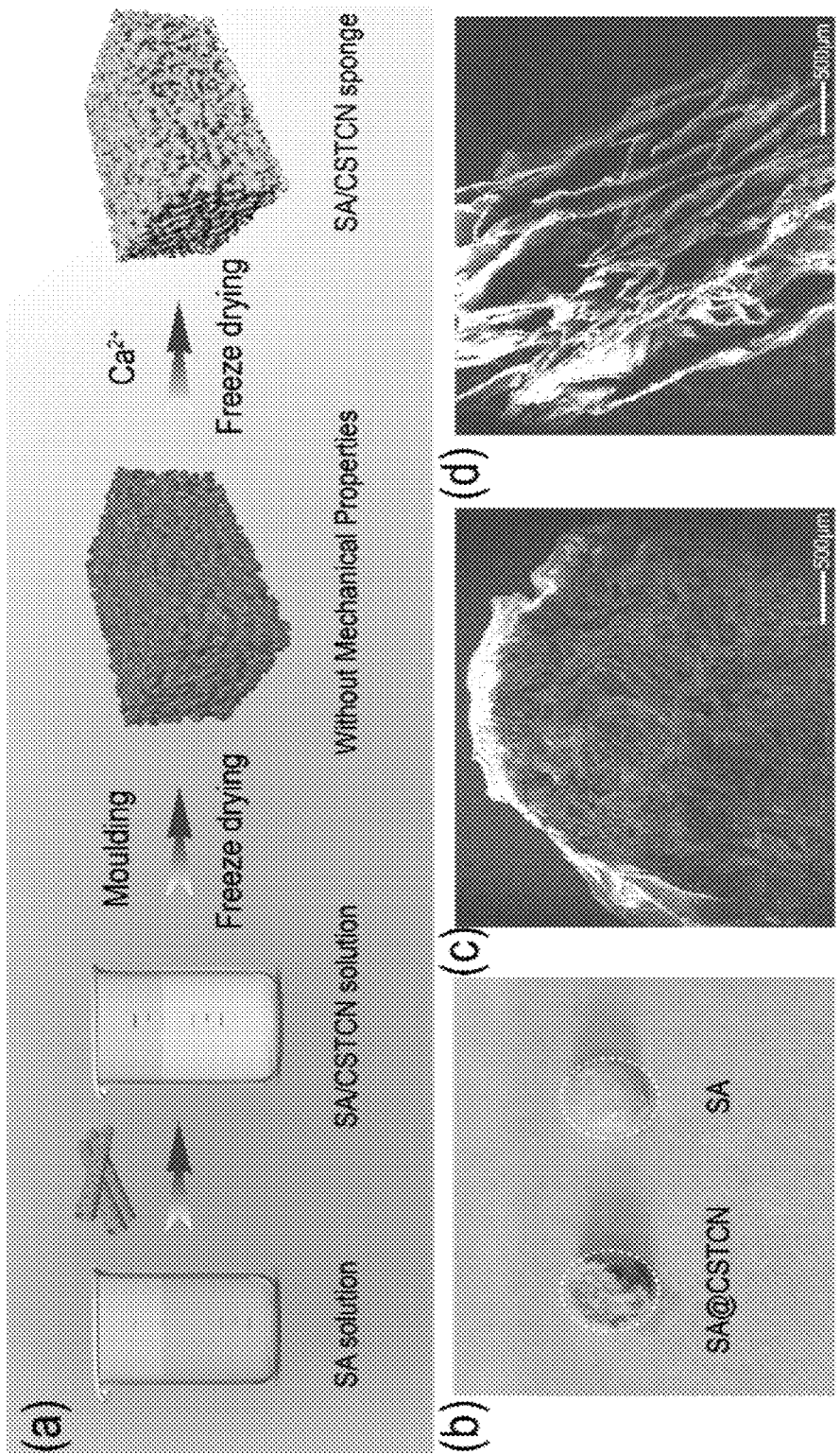
FIG. 5 shows a preparation flowchart of SA@CSTCN sponge (FIG. 4a), an appearance image of SA sponge and SA@CSTCN sponge (FIG. 4b), a surface image of SA@CSTCN sponge (FIG. 4c) and a sectional image of SA@CSTCN sponge (FIG. 4d).

FIG. 5 shows a preparation flowchart of SA@CSTCN sponge (FIG. a), an appearance image of SA sponge and SA@CSTCN sponge (FIG. b), a surface SEM image of SA@CSTCN sponge (FIG. c) and a sectional SEM image of SA@CSTCN sponge (FIG. d).

A schematic diagram of preparating the SA@CSTCN sponge is shown in FIG. 5a. Through a freeze-drying process, ice crystals in SA gel sublimate and form holes. Then, Ca$^{2+}$ is added to crosslink and cure the gel, so as to have a certain mechanical strength. In the absence of the photocatalyst, the prepared SA sponge shows translucency, indicating that light can transmit through the SA gel matrix well.

Compared with the SA sponge, SA@CSTCN sponge shows yellow color, indicating that the catalyst is well dispersed (FIG. 5b). The SA@CSTCN sponge, as shown in FIGS. 5c and d, has a larger hole, which is not only beneficial to reflection of photons, but also provides more reactive active sites. In addition, abundant holes endow the sponge with floating features, guaranteeing continuous supply of oxygen and promoting production of reactive oxygen species (ROS).

Application Example 1

Removal of Aflatoxin B$_1$ from Peanuts:

Peanuts of 5 parts with 1 kg each were taken. And CSTCN (including CSTCN-1, CSTCN-3, CSTCN-5 and CSTCN-7) of 1 g and SA@CSTCN of 3 g were added to the peanuts, stirring was performed at a constant speed of 230 rpm for 8 min, pure water of 400 kg was added, uniform mixing was performed, illuminating was performed for 6 h, a mixture was left to stand until solid-liquid separation, a supernatant was discarded, and airing was performed to remove aflatoxin B$_1$ from the peanuts.

Peanuts of 5 g before and after aflatoxin removal according to the above method were taken, cold methanol of 10 mL was added for elution, a mixture was left to stand, a suspension of 1 mL was put in a centrifuge tube for vortex oscillation for 2 min, centrifuging was performed at 4° C. and 10000 rpm for 10 min, and a concentration of aflatoxin in the supernatant was analyzed by using high performance liquid chromatography (HPLC). If the concentration of aflatoxin decreases by 85% or more, the requirements of the national standard were satisfied, and the test was regarded as successful removal.

Test Results are Shown in Table 1:

TABLE 1

| | Removal rate (%) of aflatoxin B$_1$ | | | | | | |
|---|---|---|---|---|---|---|---|
| | SA | STCN | CSTCN-1 | CSTCN-3 | CSTCN-5 | CSTCN-7 | SA@CSTCN |
| AFB1 (in dark) | 5 | 4 | 4 | 4 | 4 | 4 | 5 |
| AFB1 (in light) | 5 | 80 | 90 | 98 | 94 | 91 | 95 |
| Removal effect | Unsuccessful | Unsuccessful | Successful | Successful | Successful | Successful | Successful |

The above test results show that the CSTCN prepared by the present disclosure can effectively degrade and remove aflatoxin from the peanuts. After forming SA@CSTCN by combining the CSTCN with SA, the material can be spongy and recyclable, thus having little impact on food quality.

Application Example 2

Removal of Aflatoxin $B_1$ from Peanut Oil:

Peanut oil of 5 parts with 1 kg each was taken. And CSTCN (including CSTCN-1, CSTCN-3, CSTCN-5 and CSTCN-7) of 1 g and SA@CSTCN of 3 g were added to the peanut oil, pure water of 10 kg was added, oscillation was performed for 35 min, stirring was performed in light for 6 h, centrifuging was performed at 10000 rpm for 10 min, a mixture was left to stand, a water layer was discarded, that is, aflatoxin $B_1$ insoluble in water was removed from the peanut oil.

Peanut oil of 5 mL before and after aflatoxin removal according to the above method was taken, acetonitrile of 5 mL was added, a mixture was left to stand, a suspension of 1 mL was put in a centrifuge tube for centrifuging at 13000 rpm and 4° C. for 10 min, and a concentration of aflatoxin in the supernatant was analyzed by using high performance liquid chromatography (HPLC). If the concentration of aflatoxin decreases by 85% or more, the requirements of the national standard were satisfied, and the test was regarded as successful removal.

Test Results are Shown in Table 2:

TABLE 2

| | Removal rate (%) of aflatoxin $B_1$ | | | | | | |
|---|---|---|---|---|---|---|---|
| | SA | STCN | CSTCN-1 | CSTCN-3 | CSTCN-5 | CSTCN-7 | SA@CSTCN |
| AFB1 (in dark) | 5 | 4 | 4 | 4 | 4 | 4 | 5 |
| AFB1 (in light) | 5 | 78 | 91 | 96 | 94 | 92 | 94 |
| Removal effect | Unsuccessful | Unsuccessful | Successful | Successful | Successful | Successful | Successful |

The above test results show that the CSTCN and SA@CSTCN sponge prepared by the present disclosure can also effectively degrade and remove aflatoxin from the peanut oil.

The examples described above are merely the preferred examples of the present disclosure, and are not intended to limit the present disclosure in other forms, and can be changed or modified by those skilled in the art with the technical contents disclosed above to equivalent examples with equivalent changes. However, any simple amendment, equivalent change and modification made to the examples according to the technical essence of the present disclosure without departing from contents of the technical solution of the present disclosure should still fall within the protection scope of the technical solution of the present disclosure.

What is claimed is:

1. A method for preparing a SA@CDs/g-$C_3N_4$ composite material, comprising:
    adding a CDs/g-$C_3N_4$ compound into water, and uniformly dispersing same through ultrasonic treatment; adding sodium alginate, intensely stirring and fully mixing a mixture, and forming a pregel solution; transferring the fully mixed pregel solution into a mold, and freeze-drying the pregel solution to obtain sponge; and soaking the sponge in a $CaCl_2$) solution for gel, performing washing with deionized water, performing freeze-drying, and obtaining the SA@CDs/g-$C_3N_4$ composite material; wherein
    a mass-volume ratio of the CDs/g-$C_3N_4$ compound to the water is within 1:300-1:800, g/mL, a mass ratio of the CDs/g-$C_3N_4$ compound to the sodium alginate is within 1:4-1:10, and a concentration of the $CaCl_2$) solution is within 1 wt %-8 wt %;
    a method for preparing the CDs/g-$C_3N_4$ compound comprises:
    adding melamine and thiocyanuric acid into water, and stirring evenly a mixture; adding a CDs solution and stir evenly a mixture; and filtering, washing, drying and transferring a mixed solution to a muffle furnace for high-temperature calcination, and obtaining the CDs/g-$C_3N_4$ compound; wherein
    a molar ratio of melamine to the thiocyanuric acid is within 1:0.5-1:1.5, and the high-temperature calcination is performed under the following conditions: heating is performed to 550° C.-650° C. at a rate of 2° C./min-6° C./min, and calcination is performed at this temperature for 3 h-6 h; and
    a method for preparing the CDs solution comprises:
    placing an orange juice in a reactor lined with polytetrafluoroethylene, and heating at 180° C.-210° C. for 8 h-12 h; and performing natural cooling, centrifuging and filtering a reaction product, and forming a transparent brownish-yellow carbon quantum dot solution, that is, the CDs solution.

2. A method of aflatoxin removal by applying a SA@CDs/g-$C_3N_4$ composite material, comprising:
    placing an orange juice in a reactor lined with polytetrafluoroethylene, and heating at 180° C.-210° C. for 8 h-12 h; and performing natural cooling, centrifuging and filtering a reaction product, and forming a CDs solution, the CDs solution being a transparent brownish-yellow carbon quantum dot solution;
    adding melamine and thiocyanuric acid into water, and stirring evenly; adding the CDs solution and stirring evenly; and filtering, washing, drying and transferring a mixed solution to a muffle furnace for a high-temperature calcination, and obtaining a CDs/g-$C_3N_4$ compound; wherein a molar ratio of melamine to thiocyanuric acid is within 1:0.5-1:1.5, and the high-temperature calcination is performed under following conditions: heating is performed to 550° C.-650° C. at a rate of 2° C./min-6° C./min, and calcination is performed at 550° C.-650° C. for 3 h-6 h;
    adding the CDs/g-$C_3N_4$ compound into water, and uniformly dispersing through ultrasonic treatment; adding sodium alginate, intensely stirring and fully mixing, and forming a pregel solution; transferring the pregel solution into a mold, and freeze-drying the pregel solution to obtain a sponge; and soaking the sponge in a $CaCl_2$) solution, performing washing with deionized water, performing freeze-drying, and obtaining the SA@CDs/g-$C_3N_4$ composite material; wherein a mass-volume ratio of the CDs/g-$C_3N_4$ compound to the water is within 1:300-1:800, g/mL, a mass ratio of the CDs/g-$C_3N_4$ compound to the sodium alginate is within 1:4-1:10, and a concentration of the $CaCl_2$) solution is within 1 wt %-8 wt %; and applying the SA@CDs/g-$C_3N_4$ composite material to remove aflatoxin in food.

* * * * *